United States Patent

Lee

[11] 3,860,578
[45] Jan. 14, 1975

[54] 2-(N-ALKYLCARBAMOYLOXIMIDO)-POLYMETHYLENEIMINES

[76] Inventor: Kyu Tai Lee, 2329 Jamaica Dr., Wilmington, Del. 19810

[22] Filed: Mar. 5, 1973

[21] Appl. No.: 338,249

[52] U.S. Cl.............................. 260/239 BF, 424/244
[51] Int. Cl............................................. C07d 41/00
[58] Field of Search ............................. 260/239 BF

[56] References Cited
UNITED STATES PATENTS
3,780,178   12/1973   Tetenbaum ................... 260/239 BF OTHER PUBLICATIONS
Lowy et al., Introduction To Organic Chemistry, (New York, 1945), pages 213–215.
Conant, The Chemistry of Organic Compounds, (New York, 1934), page 269.
Burger, Medicinal Chemistry, (second ed., New York, 1960), pages 77–78.

*Primary Examiner*—Alton D. Rollins

[57] ABSTRACT

Antihypertensive 2-(N-alkylcarbamoyloximido)-polymethyleneimines of the formula

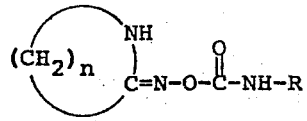

where R is selected from certain organic radicals. This class of compounds exhibits antihypertensive activity in warm-blooded animals.

An exemplary compound is: 2-(N-methylcarbamoyloximido)-heptamethyleneimine.

6 Claims, No Drawings

2-(N-ALKYLCARBAMOYLOXIMIDO)-POLYMETHYLENEIMINES

BACKGROUND OF THE INVENTION

Copending U.S. Patent Application Ser. No. 152,407, filed by Kyu Tai Lee on Jan. 11, 1971, discloses 4-aza-5-carbamoyloximidotricyclo[4.3.1.1$^{3,8}$]undecanes and their use as antihypertensive agents in warm-blooded animals.

The present invention resulted from efforts to discover new compounds possessing antihypertensive activity. The 2-(N-alkylcarbamoyloximido)-polymethyleneimines of the present invention differ materially in structure from those of the above-mentioned U.S. application, i.e., the amido nitrogen of that invention is part of a tricyclic ring system, while the amido nitrogen of the present invention is part of a monocyclic ring system.

SUMMARY OF THE INVENTION

This invention is a class of novel 2-(N-alkylcarbamoyl)-oximido)-polymethyleneimines of the formula

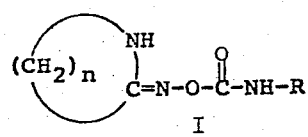

I where $n$ is an integer from 6 to 11 inclusive, and R is methyl or ethyl.

The invention also includes methods for treating hypertension in warm-blooded animals which comprise administering to said animals an antihypertensive amount of compounds of this invention, and further includes pharmaceutical compositions which contain an antihypertensive amount of a compound of this invention in combination with suitable pharmaceutical adjuvants, carriers, and/or modifiers.

DETAILED DESCRIPTION OF THE INVENTION

Synthesis

The compounds of the present invention can be prepared by carbamoylation of the appropriate oxime, which can be prepared according to the process described by Behringer et al., Annalen der Chemie, vol. 607, p. 67 (1957), with the appropriate isocyanate according to the following reaction scheme:

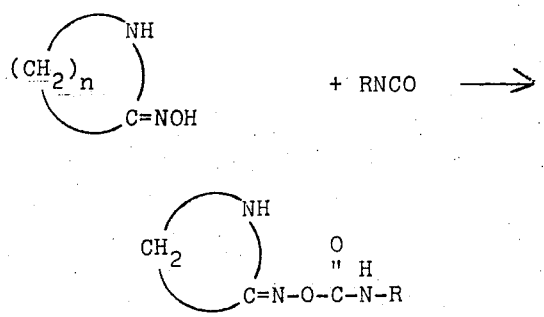

where $n$ is an integer of 6 to 11 inclusive, and R is methyl or ethyl.

The reaction represented by Equation (A) above can be performed by contacting the appropriate reactants in an inert solvent at a temperature of about 10°–40°C, preferably 25°C. Suitable solvents include methylene chloride, chloroform, benzene, toluene and tetrahydrofuran. The desired product can be isolated by removing the solvent by conventional means, e.g., evaporation, and can be purified by recrystallization from additional solvent.

The following examples illustrate the preparation of compounds of the present invention.

EXAMPLE 1

2-(N-methylcarbamoyloximido)-octamethyleneimine

A solution of 0.8 gram of methylisocyanate in 15 ml of methylene chloride is added to a suspension of 2.1 grams of 2-oximidooctamethyleneimine in 25 ml methylene chloride. The mixture is maintained at room temperature for appropriately 1½ hours, after which the mixture is concentrated by evaporation. The residue is washed in ether and separated therefrom by filtration. The solid product is purified by recrystallizing from a methylene chloride/ether mixture, thus yielding 2 grams of 2-(N-methylcarbamoyloximido)-octamethyleneimine, m.p. 84°–85°C.

EXAMPLE 2

2-(N-ethylcarbamoyloximido)-octamethyleneimine

The above named compound was prepared by the method described in Example 1 by substituting ethylisocyanate for methylisocyanate, thus yielding 2-(N-ethylcarbamoyloximido)-octamethyleneimine, m.p. 66.5°–67.5°C.

EXAMPLE 3

2-(N-methylcarbamoyloximido)-dodecamethyleneimine

The above named compound was prepared by the method described in Example 1 by substituting 2-oximidoododecamethyleneimine for 2-oximidooctamethyleneimine, thus yielding 2-(N-methylcarbamoyloxamido)-dodecamethyleneimine, m.p. 99°C.(dec.)

EXAMPLE 4

2-(N-methylcarbamoyloximido)-heptamethyleneimine

The above named compound was prepared by the method described in Example 1 by substituting 2-oximidoheptamethyleneimine for 2-oximidooctamethyleneimine, thus yielding 2-(N-methylcarbamoyloximido)-heptamethyleneimine, m.p. 91°–92°C.

EXAMPLE 5

2-(N-ethylcarbamoyloximido)-heptamethyleneimine

The above named compound was prepared by the method described in Example 1 by substituting 2-oximdoheptamethyleneimine and ethylisocyanate for 2-oximidooctamethyleneimine and methylisocyanate, respectively, thus yielding 2-(N-ethylcarbamoyloximido)-heptamethyleneimine, m.p. 91°–92°C.

Formulation and Use

The compounds of this invention can be administered in the treatment of hypertension according to the invention by any means that effects contact of the active ingredient compound with the site of action in the body of a warm-blooded animal. For example, administration can be parenterally, i.e., subcutaneously, intravenously, intramuscularly, or intraperitoneally. Alternatively, or concurrently, administration can be by the oral route.

The dosage administered will be dependent upon the age, health and weight of the recipient, the extent of disease, kind of concurrent treatment, if any, frequency of treatment, and the nature of the effect desired. Generally a daily dose of active ingredient of the compound will be from about 0.01–50 milligrams per kilogram of body weight. Ordinarily, from 0.05–40 and preferably 0.1–20 milligrams per kilogram per day in one or more applications per day are effective to obtain the desired results.

The antihypertensive activity of the compounds of the invention is evidenced by tests conducted in hypertensive rats. In a test involving rats made hypertensive by repeated injections of desoxycorticosterone acetate (DOCA) according to the method described by Stanton and White [*Arch. Intern. Pharmacodyn.*, 154, 351 (1965)], 2-(N-methylcarbamoyloximido)-octamethyleneimine is injected orally into each of eight or more test animals. The compound is prepared in an aqueous polyvinyl alcohol acacia vehicle and administered at a volume to body weight ratio of 5.0 ml/kg. Systolic blood pressure is determined by a modification of the microphone-manometer technique [Friedman, M. and Freed, S.C., Proc. Soc. Exp. Biol. and Med., 70, 670 (1949)] at one or more time intervals after dosing.

It has been determined as a result of the test that 5.8 mg/kg of 2-(N-methylcarbamoyloximido)-octamethyleneimine produces a 30 mm mercury (mm Hg) reduction in blood pressure compared with the blood pressure of a concurrently tested group of 16 or more rats that are orally dosed with only the aqueous polyvinyl alcohol acacia vehicle. Other compounds of the invention tested in a similar manner also show a significant activity in reducing blood pressure. For example, in the same test procedure it has been determined that the mg/kg dose to lower the blood pressure by 30 mm Hg (Effective Dose 30 value, ED30) for 2-(N-ethylcarbamoyloximido)-octamethyleneimine is 7.0 mg/kg; for 2-(N-methylcarbamoyloximido)-dodecylmethyleneimine the ED30 value is 26 mg/kg; and for 2-(N-ethylcarbamoyloximido)-heptamethyleneimine the ED30 value is 26 mg/kg.

The compounds of this invention can be employed in useful pharmaceutical compositions according to the present invention in such dosage forms as tablets, capsules, powder packets or liquid solutions, suspensions or elixirs for oral administration or liquid for parenteral use, and in certain cases, suspensions for parenteral use (except intravenous injections). In such compositions, the active ingredient will ordinarily be present in an amount of about 0.5 to 95 percent by weight based on the total weight of the composition.

The antihypertensive composition of the present invention will also contain a solid or liquid non-toxic pharmaceutical carrier for the active ingredient. In one embodiment of such a pharmaceutical composition the solid carrier is a capsule which can be of the ordinary gelatin type. In the capsules will be from about 5–90 percent by weight of a compound of the invention and 95–10 percent of a carrier. In another embodiment the active ingredient is tableted with or without adjuvants. In yet another embodiment, the active ingredient is put into powder packets and employed. These capsules, tablets and powders can only constitute from 1–95 percent and preferably from 5–90 percent by weight of the active ingredient. These dosage forms preferably contain from about 5 to about 500 mg of active ingredient, with about 7 to about 250 most preferred.

The pharmaceutical carrier can also be a sterile liquid such as water and oil, including those of petroleum, animal, vegetable oils of synthetic origin, for example, peanut oil, soybean oil, mineral oil, sesame oil, and the like. In general, water saline, aqueous dextrose (glucose) and related sugar solutions and glycol such as propylene glycol or polyethylene glycols are preferred liquid carriers, particularly for injectable solutions. Sterile injectable solutions such as saline will ordinarily contain from about 0.5 to 25 percent and preferably about 1-10% by weight of active ingredient.

As mentioned above, oral administration can be in a suitable suspension or syrup, in which the active ingredient ordinarily would constitute from about 0.7 to 10 percent and preferably about 1–5 percent by weight. The pharmaceutical carrier in such compositions can be a watery vehicle such as an aromatic water a syrup, or a pharmaceutical mucilage.

Suitable pharmaceutical carriers are described in "Remington's Pharmaceutical Sciences" by E. W. Martin, a well known reference text in this field.

The following examples will further illustrate the preparation of pharmaceutical compositions of the invention.

EXAMPLE 6

A large number of unit capsules are prepared by filling two-piece hard gelatin capsules each with 250 milligrams of powdered 2-(N-ethylcarbamoyloximido)-octamethyleneimine, 110 milligrams of lactose, 32 milligrams of talc and 8 milligrams of magnesium stearate.

EXAMPLE 7

A mixture of 2-(N-ethylcarbamoyloximido)octamethyleneimine in soybean oil is prepared and injected by means of a positive displacement pump into gelatin to form soft capsules containing 35 milligrams of the active ingredient. The capsules are washed in petroleum ether and dried.

EXAMPLE 8

A large number of tablets are prepared by conventional procedures so that the dosage unit is 100 milligrams of active ingredient, 7 milligrams of magnesium stearate, 11 milligrams of microcrystalline cellulose, 11 milligrams of cornstarch and 98.8 milligrams of lactose. Appropriate coatings may be applied to increase palatability or delay absorption.

EXAMPLE 9

A parenteral composition suitable for administration by injection is prepared by stirring 1.5 percent by weight of 2-(N-methylcarbamoyloximido)-dodecamethyleneimine in 10 percent by volume propylene glycol in water. The solution is sterilized by filtration.

EXAMPLE 10

An aqueous composition is prepared for oral administration so that each 5 milliliters contains 50 milligrams of finely divided 2-(N-ethylcarbamoyloximido)-heptamethyleneimine, 500 grams of acacia, 5 milligrams of sodium benzoate, 1.0 gram of sorbitol solution, U.S.P., 5 milligrams of sodium saccharin and 0.025 milliliter of vanilla tincture.

EXAMPLE 11

A parenteral composition stuiable for administration by injection is prepared by dissolving 1 percent by weight of active ingredient in sodium chloride injection U.S.P. XV and adjusting the pH of the solution to between 6 and 7. The solution is sterilized by filtration.

I claim:

1. Compounds of the formula

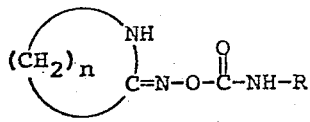

where $n$ is an integer from 6–11 inclusive and R is methyl or ethyl.

2. A compound of claim 1 which is 2-(N-methylcarbamoyloximido)-octamethyleneimine.

3. A compound of claim 1 which is 2-(N-ethylcarbamoyloximido)-octamethyleneimine.

4. A compound of claim 1 which is 2-(N-methylcarbamoyloximido)-dodecamethyleneimine.

5. A compound of claim 1 which is 2-(N-methylcarbamoyloximido)-heptamethyleneimine.

6. A compound of Formula 1 which is 2-(N-ethylcarbamoyloximido)-heptamethyleneimine.

* * * * *